United States Patent
Hwang

(10) Patent No.: US 7,484,217 B2
(45) Date of Patent: Jan. 27, 2009

(54) METHOD FOR AUTOMATIC ADJUSTMENT OF TIME A CONSUMER WAITS TO ACCESS DATA FROM A QUEUE DURING A WAITING PHASE AND TRANSMISSION PHASE AT THE QUEUE

(75) Inventor: Hai-Yann Hwang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/066,065

(22) Filed: Feb. 24, 2005

(65) Prior Publication Data
US 2006/0190639 A1    Aug. 24, 2006

(51) Int. Cl.
*G06F 13/00* (2006.01)
(52) U.S. Cl. .................. 719/314; 718/100; 718/104
(58) Field of Classification Search ................ 719/312, 719/313, 314; 718/100, 104
See application file for complete search history.

(56) References Cited

U.S. PATENT DOCUMENTS

| | | |
|---|---|---|
| 5,654,968 A | 8/1997 | Smiroldo |
| 5,819,053 A | 10/1998 | Goodrum et al. |
| 5,862,411 A | 1/1999 | Kay et al. |
| 6,182,252 B1 | 1/2001 | Wong et al. |
| 6,243,778 B1 | 6/2001 | Fung et al. |
| 6,247,064 B1 * | 6/2001 | Alferness et al. ............ 719/312 |
| 6,427,161 B1 * | 7/2002 | LiVecchi .................... 718/102 |
| 6,523,058 B1 | 2/2003 | Fung et al. |
| 6,665,601 B1 | 12/2003 | Nielsen |

OTHER PUBLICATIONS

M.C. Daconta, "When Runtime.exec() won't", [online], [retrieved on Jan. 13, 2005] pp. 1-16 http://www.javaworld.com/javaworld/jw-12-1229-traps_p.html.

* cited by examiner

*Primary Examiner*—Andy Ho
(74) *Attorney, Agent, or Firm*—David W. Victor; Konrad Raynes & Victor LLP

(57) ABSTRACT

Provided are a method, system, and program automatic adjustment of time a consumer waits to access data from a queue during a waiting phase and transmission phase at the queue. A determination is made as to whether a queue is in a waiting phase or a transmission phase for data in response to waiting for a waiting phase wait time when initiating an operation to access data from the queue. During the waiting phase data is not available in the queue for reading. An incremental wait time is waited in response to determining that the queue is in the waiting phase. A determination is made as to whether the queue is in the waiting phase or the transmission phase in response to waiting the incremental wait time. A total wait time is recorded in response to determining that the queue is in the transmission phase. The at least one recorded total wait time is used to determine the waiting phase wait time to use when initiating the operation to access data from the queue.

10 Claims, 3 Drawing Sheets

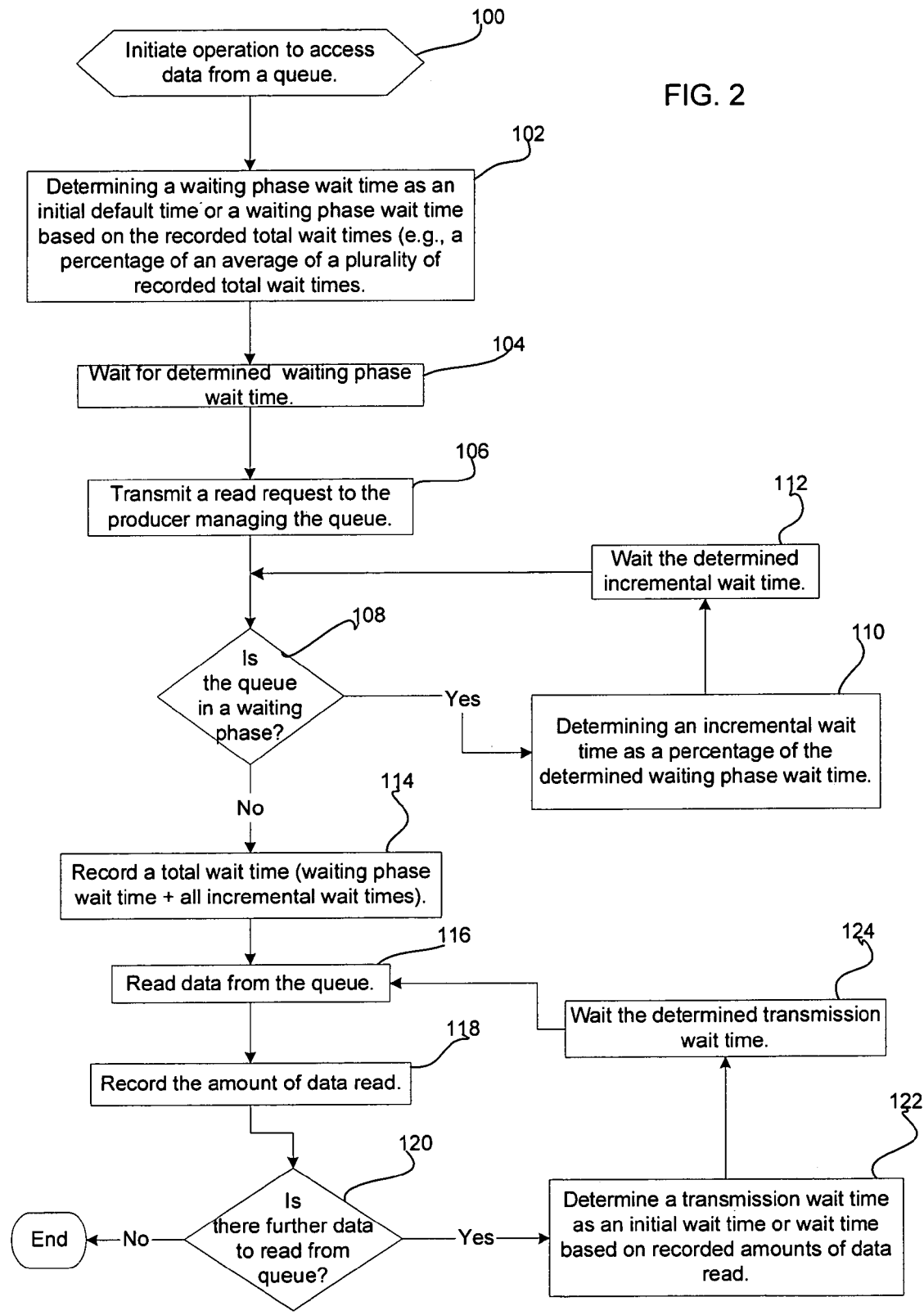

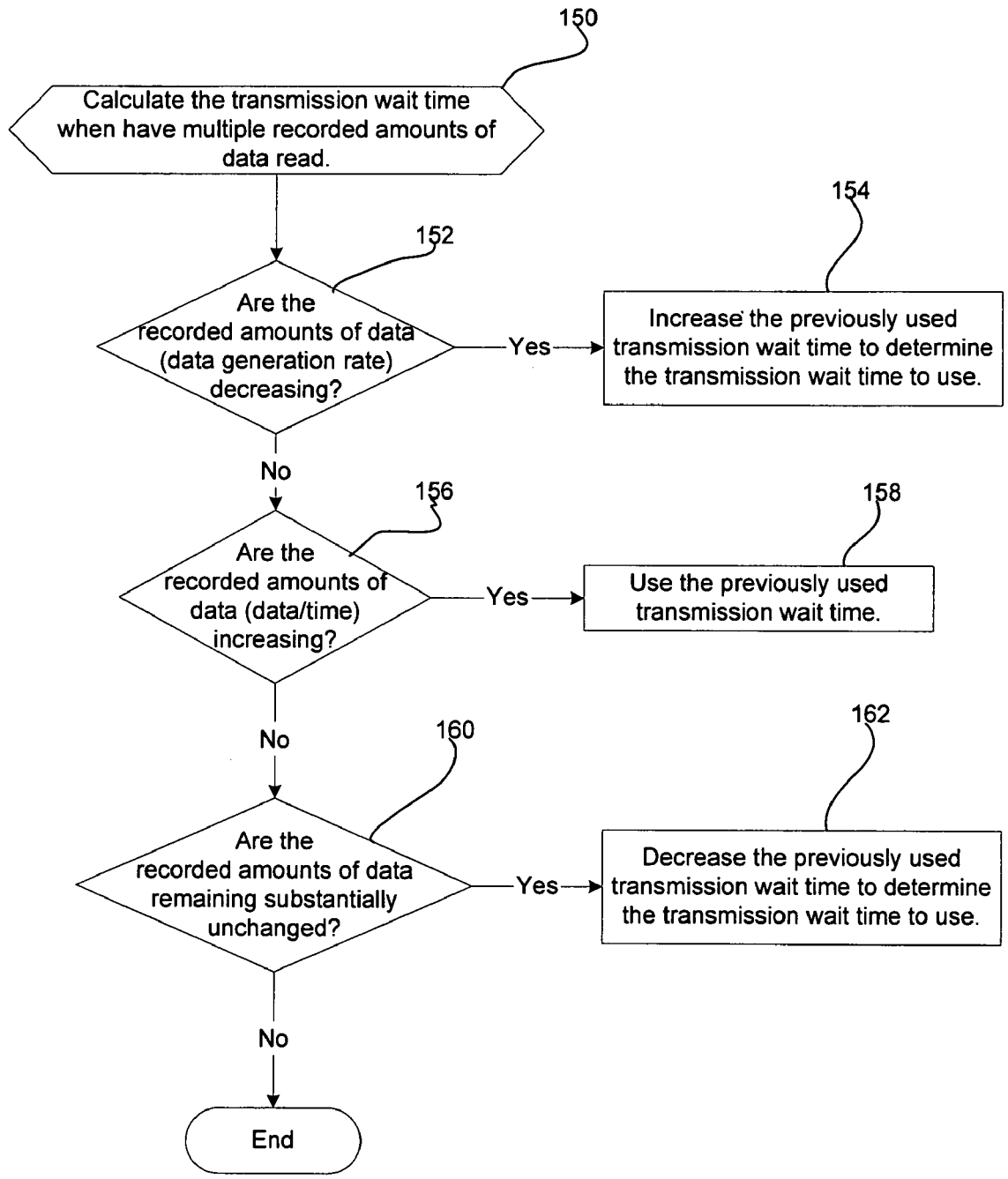

METHOD FOR AUTOMATIC ADJUSTMENT OF TIME A CONSUMER WAITS TO ACCESS DATA FROM A QUEUE DURING A WAITING PHASE AND TRANSMISSION PHASE AT THE QUEUE

BACKGROUND OF THE INVENTION

1. Field of the Invention

The present invention relates to a method, system, and program for automatic adjustment of time a consumer waits to access data from a queue during a waiting phase and transmission phase at the queue.

2. Description of the Related Art

In the current art, once a process or thread, i.e., consumer, has requested data in a queue managed by another process or thread, i.e., a producer, the consumer may then periodically poll the producer queue to determine whether there is data to access. A queue comprises a data structure used to sequence multiple demands for a resource, such as storage resources, computational resources, printing resources, etc. Requests in a queue may be processed in a first-in-first-out (FIFO) ordering. If data is not available at the producer queue, then the consumer goes into a wait state and then again checks the producer queue after the wait time. If the consumer polls the producer queue at too frequent of a time interval before data is available, then needless polling requests are issued, thus wasting the consumer resources expended to issue the polling requests and the producer resources used to respond in the negative to the polling request. On the other hand, if the consumer polls the producer queue at too infrequent of a time interval, then data may not be accessed and removed from the queue at a sufficiently frequent rate to leave room in the queue for further data. In such case, the producer cannot accept further data, which may cause problems for processes sending the producer data.

SUMMARY

Provided are a method, system, and program for automatic adjustment of time a consumer waits to access data from a queue during a waiting phase and transmission phase at the queue. A determination is made as to whether a queue is in a waiting phase or a transmission phase for data in response to waiting for a waiting phase wait time when initiating an operation to access data from the queue. During the waiting phase data is not available in the queue for reading. An incremental wait time is waited in response to determining that the queue is in the waiting phase. A determination is made as to whether the queue is in the waiting phase or the transmission phase in response to waiting the incremental wait time. A total wait time is recorded in response to determining that the queue is in the transmission phase. The at least one recorded total wait time is used to determine the waiting phase wait time to use when initiating the operation to access data from the queue.

BRIEF DESCRIPTION OF THE DRAWINGS

FIG. 2 illustrates an embodiment of operations to determine how to poll a queue.

FIG. 3 illustrates an embodiment of operations performed to determine a wait time during the data transmission phase for the queue based on recorded amounts of data read.

DETAILED DESCRIPTION

Figure 1:
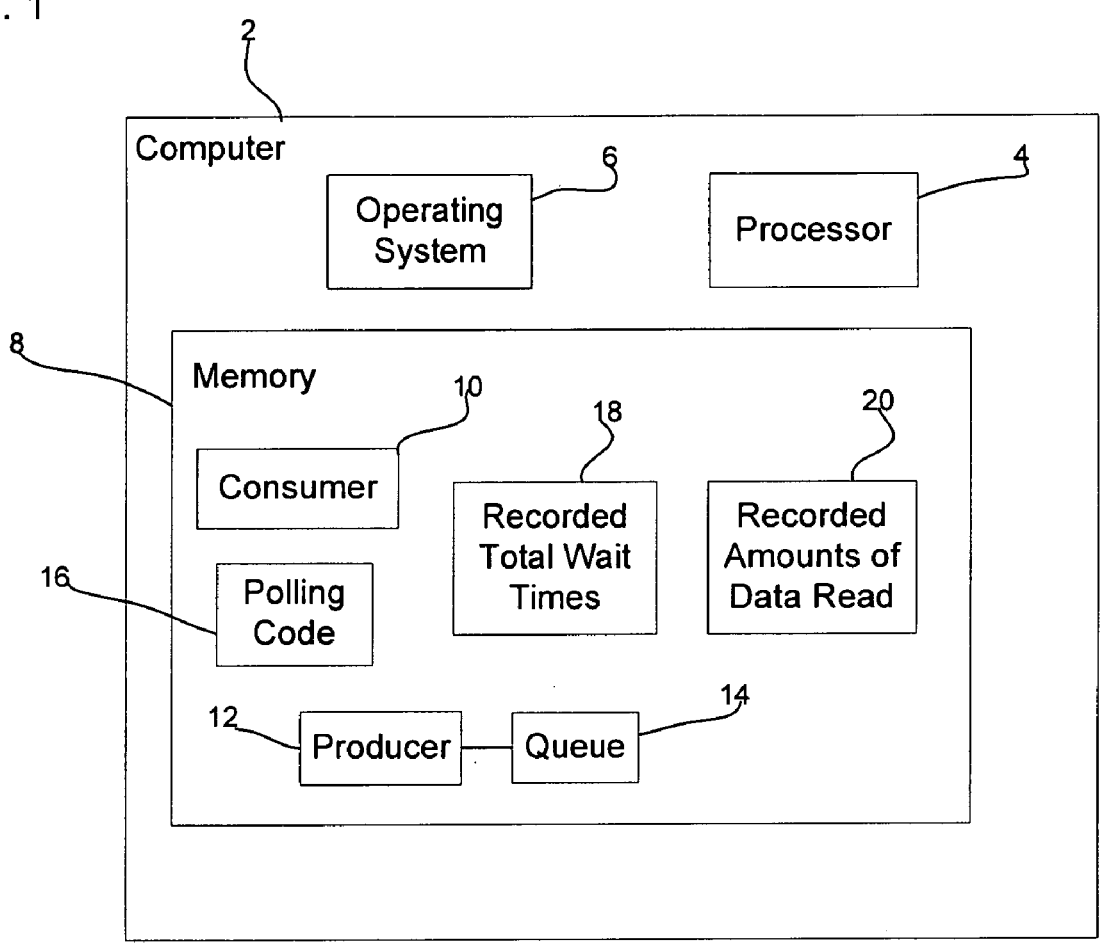
FIG. 1 illustrates an embodiment of a computing environment.

In the following description, reference is made to the accompanying drawings which form a part hereof and which illustrate several embodiments of the present invention. It is understood that other embodiments may be utilized and structural and operational changes may be made without departing from the scope of the present invention.

FIG. 1 illustrates a computer 2 including a processor 4, such as one or more central processing units (CPUs) or cores on a single processor, an operating system 6, and a memory 8 comprised of one or more memory devices. A consumer 10 and producer 12 execute in the memory 8. The consumer 10 and producer 12 may comprise a thread, process, application program, etc. The producer 12 gathers data in a queue 14 which the consumer 10 may access by issuing read requests. In FIG. 1, the consumer 10 and producer 12 reside in the same computer 2. In an alternative embodiment, the consumer and producer 12 may execute on separate machines and communicate over a network or may reside on separate virtual servers in the same computer 2.

The consumer 10 executes polling code 16, which controls how the consumer 10 polls or pulls data from the producer queue 14. If the consumer 10 wants data and the producer 12 has not yet started generating data into the queue 14, then the producer 12 is in the waiting phase where data is not yet available to access in the queue 14. Once data is available in the queue 14, then the waiting phase has ended, and the producer 12 is in a transmission phase during which data may be returned to a consumer 10. A recorded total wait times data structure 18 is maintained for the producer 12 indicating the total wait time a consumer 10 had to wait while the queue 14 maintained by the producer 12 was in the waiting phase. Each time a consumer 10 initiates a new operation to access the queue 14, then a new waiting phase wait time may be recorded in the data structure 18. A recorded amounts of data read data structure 20 is maintained for the producer 12 indicating amounts of data read in response to each read request by a consumer 10 during the transmission phase. In one embodiment, each recorded amount of data may comprise a data generation rate, i.e., data read divided by the time interval waited between read requests, which indicates the amount of data queued during the interval wait period.

A separate set of the two data structures 18 and 20 may be maintained for each producer 12 and the queues managed by that producer 12. There may be a size limit on the data structures 18 and 20, such that adding a new point of data causes the removal of an oldest point of data from the data structures 18, 20. In this way, different data is gathered for different producers to allow for a determination of the wait times during the waiting phase and transmission phase that is producer specific. This optimizes the use of this recorded data 18 and 20 because different producers used in different contexts may have different queue processing capabilities and different data generation rates. Moreover, different consumers 10 may access queues provided by a producer 12, so that the recorded information in the data structures 18 and 20 for one producer 12 is gathered from multiple consumers.

FIG. 2 illustrates an embodiment of operations implemented in the polling code 16 executed by the consumer 10 to access data from the queue 14. Upon initiating (at block 100) an operation to access data from the queue 14, the polling code 16 determines (at block 102) a waiting phase wait time as an initial default time or a waiting phase wait time based on the recorded total wait times in the data structure 18. In one embodiment, the waiting phase wait time may be calculated as a percentage of an average of up to a fixed number of the recorded total wait times in the data structure 18, e.g., an average of the most recent ten recorded wait times. For instance, the percentage may comprise 80%, so that the consumer 10 waits less than the estimated total wait time. The consumer 10 then waits (at block 104) for the determined waiting phase wait time and, after waiting, transmits (at block 106) a read request to the producer 12 managing the queue 14.

If (at block 108) the queue 14 is in the waiting phase, then the polling code 16 determines (at block 110) an incremental wait time as a percentage, e.g., 5%, of the determined/estimated waiting phase wait time. The consumer 10 then waits (at block 112) the determined incremental wait time. In one embodiment, the incremental wait time is significantly less than the estimated waiting phase wait time, because after the initial waiting phase wait time, the data is likely to be available within less time than the estimated waiting wait time, i.e., available soon. If (at block 108) the waiting phase has ended, then the consumer 10 records (at block 114) a total wait time (e.g., waiting phase wait time plus all incremental wait times waited) in the recorded total wait times data structure 18.

After the consumer 10 detects the end of the waiting phase and the presence of the transmission phase, then the consumer 10 reads (at block 116) data from the queue 14 and records (at block 118) the amount of data read in the recorded amounts of data read data structure 20. As discussed, in one embodiment, a recorded amount of data read may comprise a rate at which the data is read, comprising the amount of data read divided by the transmission wait time interval between read requests. If (at block 120) there is no further data for the consumer 10 to read, then control ends. Otherwise, if data is available to be read from the queue 10, then the consumer 10 determines (at block 122) a transmission wait time as a default transmission wait time or a wait time based on recorded amounts of data read, if there is sufficient points of recorded amounts of data read to make the calculation. The consumer 10 then waits (at block 124) the determined transmission wait time and returns to block 116 to read data from the queue 14 and record the amount read.

FIG. 3 illustrates an embodiment of operations implemented by the polling code 16 executed by the consumer 10 to calculate the transmission wait time to wait before requesting further data from the queue 14 if there are multiple recorded amounts of data read in the data structure 20. Upon initiating the calculation (at block 150), if (at block 152) the recorded amounts of data (e.g., data read rate comprising the amount of data read divided by the transmission wait time) are decreasing, e.g., the most recent recorded amount of data read rate is less than the previous recorded amount of data read rate, then the consumer 10 increases (at block 154) the previously used transmission wait time to determine the transmission wait time to use. This increase may comprise a percentage of the previously used transmission wait time, e.g., 10%. Reading a decreasing amount of data (e.g., data read rate) indicates that the consumer 10 is not providing the producer 12 sufficient time to replenish the queue 14 between access requests so that the consumer 10 may read the maximum amount of data in one read, e.g., one read burst. In this way, the code 16 seeks to maximize the amount of data transferred in one read operation to minimize the total number of read operations needed to transfer all the data.

If (at block 156) the recorded amounts of data (e.g., generated data over last transmission wait time) are increasing, e.g., the most recent recorded amount of data read is greater than the previous recorded amount of data read, then the consumer 10 uses (at block 158) the previously used transmission wait time. In this way, if the current transmission wait time is increasing the amount of data being read (e.g., data read rate), then there is no need to alter the previously used transmission wait time because the transfer rate, i.e., data generated into the queue 14 since last read divided by the transmission wait time, is improving. Otherwise, if (at block 160) the recorded amounts of data (e.g., data read rates) remain substantially unchanged, then the consumer 10 decreases (at block 162) the previously used transmission wait time to determine the transmission wait time to use. In one embodiment, two recorded amounts remain substantially unchanged if their difference falls within a deemed insignificant range, e.g., 5%. In this way, if the amount of data being read (e.g., data read rate) is not significantly changing, then the consumer 10 increases the read interval to allow more time for the producer 12 generate more data in the queue 14 in order increase the amount of data transferred for one read.

The described embodiments provide techniques to intelligently adjust the wait time for a consumer accessing data from a producer queue, where different adjustment techniques may be used to estimate the wait times during the waiting phase versus the transmission phase. This allows automatic adjustment of the wait times to optimize access to the producer queue by reducing polling during the wait phase to minimize the times the consumer polls the producer queue during the waiting phase and to adjust the transmission wait time to maximize the data transferred in a single read, yet avoid the queue from remaining full and unable to accept more data. Moreover, in certain embodiments, the user may customize the calculation of the wait time based on the collected data.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The illustrated operations of FIGS. 2 and 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, executing within a computer, comprising:
   determining whether a queue is in a waiting phase or a transmission phase for data in response to waiting for a waiting phase wait time when initiating an operation to access data from the queue, wherein during the waiting phase data is not available in the queue for reading;
   waiting an incremental wait time in response to determining that the queue is in the waiting phase;
   determining whether the queue is in the waiting phase or the transmission phase in response to waiting the incremental wait time;
   recording a total wait time in response to determining that the queue is in the transmission phase; and
   using the at least one recorded total wait time to determine the waiting phase wait time to use when initiating the operation to access data from the queue.

2. The method claim 1, further comprising:
   performing an additional iteration of waiting the incremental wait time and determining whether the queue is in the waiting phase or transmission phase in response to determining that the queue is in the waiting phase after waiting the incremental wait time.

3. The method of claim 1, wherein determining the waiting phase wait time to use comprises:
   determining a percentage of an average of a plurality of recorded total wait times.

4. The method of 3, further comprising:
   determining the incremental wait time that is used as a percentage of the determined waiting phase wait time.

5. The method of claim 1, further comprising:
   reading data from the queue in response to determining that the queue is in the transmission phase;
   recording an amount of data read in the memory; and
   reading data from the queue in response to waiting a transmission wait time.

6. The method of claim 5, wherein one recorded amount of data read comprises an amount of data read divided by a previously used transmission wait time, further comprising:
   determining the transmission wait time to use based on recorded amounts of data read.

7. The method of claim 6, wherein determining the transmission wait time to use comprises:
   increasing a previously used transmission wait time in response to determining that the recorded amounts of data read are decreasing.

8. The method of claim 6, wherein determining the transmission wait time to use comprises:
   decreasing a previously used transmission wait time in response to determining that the recorded amounts of data remain substantially unchanged.

9. The method of claim 6, wherein the transmission wait time to use comprises a previously used transmission wait time in response to determining that the recorded amounts of data read are increasing.

10. The method of claim 1, further comprising:
    communicating with a plurality of producers managing a plurality of queues, wherein separate recorded wait times are gathered and maintained in the memory for each producer and are used to determine the wait phase wait time to access the at least one queue managed by each producer.

* * * * *